United States Patent
Duman et al.

(10) Patent No.: US 12,351,512 B2
(45) Date of Patent: Jul. 8, 2025

(54) RARE EARTH FRITS FOR FLUORESCENCE AND METHODS FOR LASER MARKING APPLICATIONS

(71) Applicant: Ferro Corporation, Mayfield Heights, OH (US)

(72) Inventors: Yasin Duman, Cousances-les-Forges (FR); Joesph E. Sarver, Washington, PA (US); Lutz Poth, Rossdorf (DE)

(73) Assignee: VIBRANTZ CORPORATION, Mayfield Heights, OH (US)

( * ) Notice: Subject to any disclaimer, the term of this patent is extended or adjusted under 35 U.S.C. 154(b) by 0 days.

(21) Appl. No.: 18/009,131

(22) PCT Filed: Apr. 30, 2021

(86) PCT No.: PCT/US2021/030041
§ 371 (c)(1),
(2) Date: Dec. 8, 2022

(87) PCT Pub. No.: WO2021/257190
PCT Pub. Date: Dec. 23, 2021

(65) Prior Publication Data
US 2023/0312397 A1    Oct. 5, 2023

Related U.S. Application Data

(60) Provisional application No. 63/040,209, filed on Jun. 17, 2020.

(51) Int. Cl.
| | |
|---|---|
| C03C 8/02 | (2006.01) |
| B23K 26/352 | (2014.01) |
| C03C 3/064 | (2006.01) |
| C03C 3/091 | (2006.01) |
| C03C 3/095 | (2006.01) |
| C03C 4/12 | (2006.01) |
| C03C 8/16 | (2006.01) |
| C03C 17/04 | (2006.01) |

(52) U.S. Cl.
CPC .............. *C03C 8/02* (2013.01); *B23K 26/352* (2015.10); *C03C 3/064* (2013.01); *C03C 3/091* (2013.01); *C03C 3/095* (2013.01); *C03C 4/12* (2013.01); *C03C 8/16* (2013.01); *C03C 17/04* (2013.01); *C03C 2218/32* (2013.01)

(58) Field of Classification Search
CPC .. C03C 8/02; C03C 8/16; C03C 3/064; C03C 3/068; C03C 3/091; C03C 3/095; C03C 4/12
See application file for complete search history.

(56) References Cited

U.S. PATENT DOCUMENTS

| | | | |
|---|---|---|---|
| 7,736,546 B2 | 6/2010 | Prunchak | |
| 9,487,435 B2 | 11/2016 | Sakoske et al. | |
| 2015/0175476 A1* | 6/2015 | Diss | C03C 8/16 428/428 |
| 2018/0017910 A1 | 1/2018 | Sawada et al. | |
| 2018/0179101 A1* | 6/2018 | Duman | C09K 11/7726 |
| 2020/0262738 A1* | 8/2020 | Hengst | C03C 3/112 |
| 2021/0115281 A1* | 4/2021 | Guedon | C03C 3/062 |
| 2023/0159377 A1* | 5/2023 | Naruse | C03C 8/16 347/102 |

FOREIGN PATENT DOCUMENTS

| | | | | |
|---|---|---|---|---|
| JP | 2020033241 A | | 3/2020 | |
| WO | WO-2014025539 A1 * | | 2/2014 | ......... B23K 26/0006 |

OTHER PUBLICATIONS

International Search Report corresponding to PCT/US2021/030041, dated Jul. 29, 2021 1 page.
Espacenet Bibliographic data and Machine Translation for JP2020033241A, published Mar. 5, 2020, 25 pages.

* cited by examiner

*Primary Examiner* — Elizabeth A. Bolden
(74) *Attorney, Agent, or Firm* — Oliff PLC

(57) ABSTRACT

Fluorescent rare earth glass frits are suitable for laser marking. A marking composition including fluorescent glass frits is disclosed that is capable of emitting fluorescence under irradiation of ultraviolet rays. A method of forming marks or indicia on a substrate using the fluorescent rare earth glass frits is also disclosed.

12 Claims, 2 Drawing Sheets

RARE EARTH FRITS FOR FLUORESCENCE AND METHODS FOR LASER MARKING APPLICATIONS

CROSS-REFERENCE TO RELATED APPLICATIONS

This application claims priority to PCT Patent Application No. PCT/US2021/030041 filed 30 Apr. 2021, and U.S. Application Ser. No. 63/040,209, filed 17 Jun. 2020, which are hereby incorporated by reference in their entireties.

FIELD

The present invention relates to the field of fluorescent rare earth glass frits and related methods of laser marking using such fluorescent rare earth glass frits. The present invention also relates to a method of forming marks or indicia on a substrate using the fluorescent rare earth glass frits according to the present invention. The present invention further relates to the fluorescent rare earth glass frits formed on the substrate according to the present invention, and emits fluorescence when excited by ultraviolet rays.

BACKGROUND

Glass frit compositions with controlled brightness and contrast can be formed on the substrates ranging from metal, ceramic, and glass piece. For forming marks or indicia on the metal, ceramic and glass piece, the entire piece can be heated in an oven or furnace at an elevated temperature to adhere the glass frit composition on the piece permanently. It may be potentially desirable to form marks or indicia on a large sized piece without using an oven or furnace. It would be also potentially desirable to provide additional functionality of fluorescence in glass in other applications. Laser marking is a marking technique that uses lasers and other forms of radiant energy to bond an additive marking substance to a wide range of substrates. Fluorescence is an emission of light. Fluorescence is an effect usually used for paints, polymers such as polishes, or very technical items such as lasers, banknotes, or medical imaging. Fluorescence is observed in a glass frit.

BRIEF SUMMARY OF THE INVENTION

The difficulties and drawbacks associated with previously known materials and approaches are addressed in the present invention as follows. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Compositions including the fluorescent glass frits, and methods to obtain fluorescent marks or indicia from the fluorescent glass frits are sought. The present invention represents one such effort. Fluorescence is a light emission which follows an absorption of UV light or X-rays. Lasers can be used to provide the UV or X-ray irradiation. This emitted light is called luminescence and is visible only under exposure.

In the following the glass frit which contains element(s) able to produce fluorescence in glass will be named "the fluorescent glass frit" or "glass frit". The concentrate which contains element(s) able to produce fluorescence and forms marks or indicia by a laser marking process according to the present invention on a substrate will be named "fluorescent concentrate" or "concentrate." The marking compositions containing the fluorescent glass frit or fluorescent concentrate to form markings or indicia on the substrate will be named as "the marking composition" or "composition" herein. The substrates on which the fluorescent glass frits and the fluorescent concentrates are bonded to include at least a portion of metal, ceramic and/or glass pieces, and, regardless of the overall size of the pieces, will be named as "substrates".

The present invention provides a marking composition including fluorescent glass frits and fluorescent concentrates that can be permanently and additively formed on a portion of substrates after the portion is irradiated by a radiant energy from a laser source. The compositions of the fluorescent glass frits and/or fluorescent concentrates include rare earth compounds. The rare earth compounds include one or more of terbium (Tb), europium (Eu), cerium (Ce), gadolinium (Gd), samarium (Sm), dysprosium (Dy), vanadium (V), and combinations thereof. Preferably, the rare earth compounds include one or more of terbium, europium, cerium. The rare earth compound can be rare earth oxide. The rare earth compound can be related to the emission of light, including visible light with wavelength ranging about 400 nm to about 700 nm. The invention further provides methods of forming marks or indicia on a substrate using the fluorescent glass frits and/or fluorescent concentrates according to the invention. The marks and indicia formed on the substrate can emit fluorescence mostly in the visible wavelengths when irradiated by UV rays.

The present invention further provides a marking composition that can be disposed on a portion of glass or ceramic tile by laser marking process for forming markings or indicia.

The present invention also provides a marking composition that can emit visible fluorescence when irradiated by ultraviolet (UV) rays.

The composition including the fluorescent glass frits and/or fluorescent concentrates that are free of at least one of lead, cadmium, nickel, and chromium. Certain rare-earth oxides may contain traces of nickel and/or chromium.

One embodiment of the invention is a composition comprising a carrier from about 60 to about 95 wt. %, and a glass frit from about 5 wt. % to about 40 wt. %, the glass frit comprising from about 10 to about 60 wt. % $SiO_2$, from about 0.1 to about 30 wt. % $B_2O_3+Al_2O_3$, from about 10 to about 35 wt. % $Na_2O+Li_2O$, from about 0.1 to about 30 wt. % $CaO+SrO$. Instead of oxides, it is possible to have certain starting materials for preparing for a glass frit in different forms such as nitrate, carbonate, hydroxide, acetate, sulfate, or phosphate. The glass frit further comprises from about 0.1 to about 50 wt. % of at least one metal compound selected from the group consisting of terbium compound, europium compound, cerium compound, gadolinium compound, samarium compound, dysprosium compound, vanadium compound, and combinations thereof. Preferably, the rare earth compounds include one or more of terbium, europium, cerium (Ce). In another embodiment, the glass frit comprises from about 10 to about 42 wt. % of the at least one metal compound.

The at least one metal compound includes rare earth compound including rare earth oxide. The glass frit has an average particle size between about 0.1 and about 20 microns. The glass frit is devoid of at least one of lead, cadmium, nickel, chromium, and combinations thereof.

Fluorescence of the glass so formed is visible when irradiated by UV rays with wavelength ranging between about 320 nm and about 410 nm. Fluorescence colors also depend on the composition of the glass frit chosen. For example, fluorescence color is determined by the type of rare earth compounds in the glass frit. Fluorescence also depends on the physical properties of the glass frits such as specific surface area, average particle size, and/or particle morphology of the glass frit. For example, fluorescence intensity of the glass frit according to the present invention depends on the specific surface area and/or average particle size of the glass frit.

In another embodiment the invention provides a method of forming marks or indicia on a substrate comprising the steps of: (i) providing a substrate, (ii) providing a composition comprising: a carrier from about 60 to about 95 wt. %, and a glass frit from about 5 wt. % to about 40 wt. % comprising:

from about 10 to about 60 wt. % $SiO_2$,
from about 0.1 to about 30 wt. % $B_2O_3+Al_2O_3$,
from about 10 to about 35 wt. % $Na_2O+Li_2O$,
from about 0.1 to about 30 wt. % CaO+SrO, and
from about 0.1 to about 50 wt. % of at least one metal compound selected from the group consisting of terbium compound, europium compound, cerium compound, gadolinium compound, samarium compound, dysprosium compound, vanadium compound, and combinations thereof. Preferably, the rare earth compounds include one or more of terbium, europium, cerium. The glass frit has an average particle size between about 0.1 micron to about 20 microns, and the glass frit is devoid of at least one of lead, cadmium, nickel, chromium and combinations thereof.

(iii) disposing the composition on at least a portion of the substrate, (iv) exposing at least a portion of the composition to a radiant energy from a laser source such that the at least a portion of the composition increases in temperature, at least partially adheres to the substrate, and forms marks or indicia on the substrate that has a luminance, color, and/or degree of opacity that contrasts the substrate.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
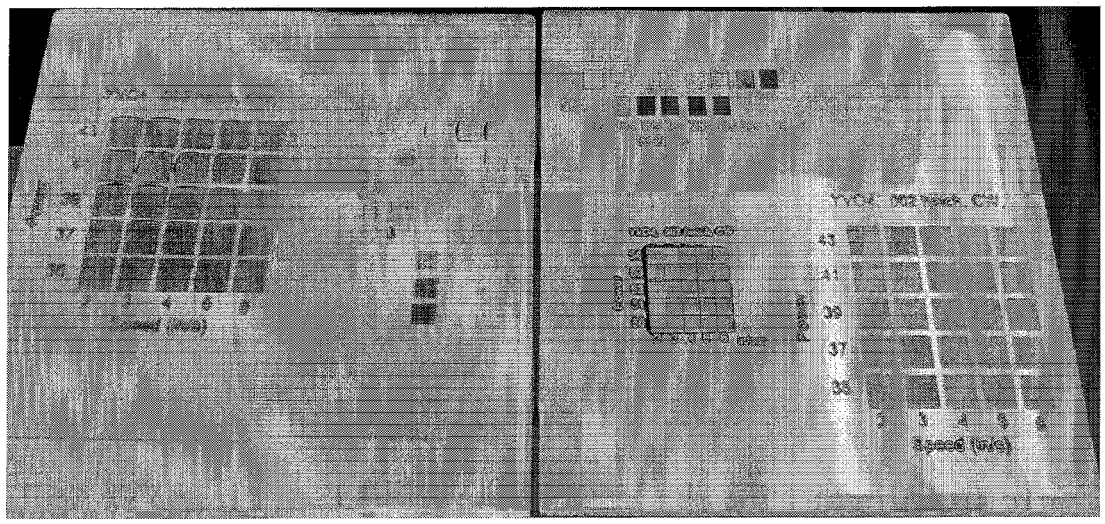
FIG. 1 is a photograph of an array of marks from Composition A formed on borosilicate glass (left) and on ceramic tile (right) by a laser marking process according to one embodiment of the invention, where the array of marks is irradiated by a normal fluorescent lighting.

The composition including fluorescent glass frits and fluorescent concentrates can be permanently bonded to at least a portion of the substrate to form marks or indicia. The marks or indicia with controlled brightness and contrast can be observed under the normal daylight. In addition, the marks or indicia emit fluorescence when irradiated by ultraviolet (UV) rays with wavelength ranging from about 320 nm to about 410 nm. Laser provides irradiation with high energy and is suitable for local heating of the composition disposed on the substrate. The object of the present invention is to provide fluorescent glass frits and fluorescent concentrates suitable for laser marking to impart to marks a fluorescent effect when irradiated by UV rays.

All compositional percentages herein are by weight and are given for a blend prior smelting for frits and prior to drying for concentrates. All percentages, temperatures, times, particle sizes and ranges of other values are presumed to be accompanied by the modifier "about." Details on each component and ingredient follow.

Fluorescent Glass Frits

As used herein, the term "fluorescent glass frits" means pre-fused glass material which is able to produce fluorescence in glass, and is typically produced by mixing starting precursors (for example, in oxides, nitrate, carbonate, hydroxide, acetate, sulfate, or phosphate), melting the mixed starting precursors at elevated temperature typically ranging from about 1,000° C. to 1,300° C., rapidly solidifying the molten material followed by grinding or milling to the desired powder size to form a glass frit. For example, glass frit can be produced by firing a mixture of different oxides, which are melted and mixed at above temperature range to form a molten mixture of oxides. Raw materials used to obtain oxides can often contain carbonates and nitrates that will decompose and during firing. In the embodiments according to the present invention, the amorphous glass is modified, such as by milling or grinding, to form glass frit of a desired average particle size, typically about 0.1 micron to about 20 micron, preferably between about 0.5 micron to about 15 micron, more preferably between about 2 micron to about 12 micron, most preferably between about 5 micron to about 10 micron. The glass frit according to the present invention is devoid of at least one of lead, cadmium, nickel, chromium, and combinations thereof.

The fluorescence-imparting glass frits or concentrates according to the present invention provide fluorescence through the presence of one or more rare earth compounds. One embodiment of the present invention is a marking composition comprising a fluorescent glass frit comprising from about 10 to about 60 wt % $SiO_2$, from about 0.1 to about 30 wt % $B_2O_3+Al_2O_3$, from about 10 to about 35 wt. % $Na_2O+Li_2O$, from about 0.1 to about 30 wt. % CaO+SrO, and from about 0.1 to about 50 wt. % of at least one metal compound selected from the group consisting of terbium compound, europium compound, cerium compound, gadolinium compound, samarium compound, dysprosium compound, vanadium compound, and combinations thereof. Preferably, the at least one metal compound is selected from the group consisting of terbium compound, europium compound, and cerium compound.

Another embodiment of the present invention is a fluorescent glass frit comprising from about 24 to about 50 wt. % $SiO_2$, from about 0.1 to about 7 wt. % $B_2O_3+Al_2O_3$, from about 15 to about 20 wt. % $Na_2O+Li_2O$, from about 0.1 to about 4 wt. % $CaO+SrO$, and from about 0.1 to about 45 wt. % of at least one metal compound selected from the group consisting of terbium compound, europium compound, cerium compound, gadolinium compound, samarium compound, dysprosium compound, vanadium compound, and combinations thereof.

Still another embodiment of the present invention is a fluorescent glass frit comprising from about 31 to about 55 wt. % $SiO_2$, from about 5 to about 13 wt. % $B_2O_3+Al_2O_3$, from about 18 to about 25 wt. % $Na_2O+Li_2O$, from about 0.1 to about 4 wt. % $CaO+SrO$, and from about 0.1 to about 27 wt. % of at least one metal compound selected from the group consisting of terbium compound, europium compound, cerium compound, gadolinium compound, samarium compound, dysprosium compound, vanadium compound, and combinations thereof.

Still yet another embodiment of the present invention is a fluorescent glass frit comprising from about 38 to about 49 wt. % $SiO_2$, from about 5 to about 13 wt. % $B_2O_3+Al_2O_3$, from about 18 to about 24 wt. % $Na_2O+Li_2O$, from about 0.1 to about 3 wt. % $CaO+SrO$, and from about 0.1 to about 22 wt. % of at least one metal compound selected from the group consisting of terbium compound, europium compound, cerium compound, gadolinium compound, samarium compound, dysprosium compound, vanadium compound, and combinations thereof.

Still another embodiment of the present invention is a fluorescent glass frit comprising from about 10 to about 40 wt. % $SiO_2$, from about 10 to about 30 wt. % $B_2O_3+Al_2O_3$, from about 1 to about 20 wt. % $Na_2O+Li_2O$, from about 20 to about 30 wt. % $CaO+SrO$, and from about 0.1 to about 10 wt. % of at least one metal compound selected from the group consisting of terbium compound, europium compound, cerium compound, gadolinium compound, samarium compound, dysprosium compound, vanadium compound, and combinations thereof.

Another embodiment of the present invention is a fluorescent glass frit comprising from about 25 to about 53.9 wt. % $SiO_2$, from about 18 to about 30 wt. % $B_2O_3+Al_2O_3$, from about 8 to about 16 wt. % $Na_2O+Li_2O$, from about 20 to about 30 wt. % $CaO+SrO$, and from about 0.1 to about 8 wt. % of at least one metal compound selected from the group consisting of terbium compound, europium compound, cerium compound, gadolinium compound, samarium compound, dysprosium compound, vanadium compound, and combinations thereof.

Still another embodiment of the present invention is a fluorescent glass frit comprising from about 35 to about 60 wt. % $SiO_2$, from about 8 to about 15 wt. % $B_2O_3+Al_2O_3$, from about 15 to about 25 wt. % $Na_2O+Li_2O$, from about 8 to about 15 wt. % $CaO+SrO$, and from about 0.1 to about 10 wt. % of at least one metal compound selected from the group consisting of terbium compound, europium compound, cerium compound, gadolinium compound, samarium compound, dysprosium compound, vanadium compound, and combinations thereof.

Table 1 below summarizes glass frit compositions useful in the practice of the subject invention. The glass frits in Table 1 can be used in forming a marking composition useful in laser marking application, which will be described herein. The oxide constituent amounts for an embodiment need not be limited to those in a single embodiment. Formulation ranges from different columns in Table 1 can be combined so long as the sum of those ranges can add up to 100 wt. %.

Combinations of ranges of oxides indicated herein as Composition 1, Composition 2, and Composition 3, and Composition 4, in various combinations are available, so long as such combinations of ranges can add up to 100 wt. %. All values are in weight percent (wt. %) unless indicated otherwise. The glass frits in Table 1 are devoid of at least one of lead, cadmium, nickel, chromium, and combinations thereof. The starting materials for preparing for a glass frit typically include oxides. On the other hand, it is possible to have certain starting materials other than oxides. For example, one or more nitrate, carbonate, hydroxide, acetate, sulfate, or phosphate can be used in preparing for a glass frit according to the present invention.

TABLE 1

Glass Frit Component Formulation Ranges

| Component | Composition 1 | Composition 2 | Composition 3 | Composition 4 |
|---|---|---|---|---|
| $SiO_2$ | 10-60 | 31-55 | 10-40 | 35-60 |
| $B_2O_3 + Al_2O_3$ | 0.1-30 | 5-13 | 10-30 | 8-15 |
| $Na_2O + Li_2O$ | 10-35 | 18-25 | 1-20 | 15-25 |
| $CaO + SrO$ | 0.1-30 | 0.1-4 | 20-30 | 8-15 |
| at least one metal compound | 0.1-50 | 0.1-27 | 0.1-10 | 0.1-10 |

Table 2 shows other embodiments of glass frit compositions useful in laser marking application according to the present invention. The glass frits in Table 2 can be used in forming a marking composition useful in laser marking application, which will be described herein. All values in Table 2 are in weight percent (wt. %). The glass frit compositions in Table 2 refer to a blend of precursor materials prior to firing, which is subsequently mixed with other solid/liquid components to form a marking composition. While most of precursor materials are in the form of oxides, the precursor materials can be other compounds, such as nitrate, carbonate, hydroxide, acetate, sulfate, or phosphate. The glass frits 2 are devoid of at least one of lead, cadmium, nickel, chromium, and combinations thereof.

TABLE 2

Glass Frit Component Formulation Ranges

| Component | Composition 5 | Composition 6 | Composition 7 | Composition 8 | Composition 9 |
|---|---|---|---|---|---|
| $SiO_2$ | 17-40 | 30-40 | 28-60 | 32-55 | 34-55 |
| $Al_2O_3$ | 10-25 | 10-20 | 0.1-7 | 0.1-4 | 0.1-3 |
| $B_2O_3$ | 0.1-7 | 0.1-5 | 0.1-15 | 1-10 | 6-10 |
| $Na_2O$ | 8-16 | 8-16 | 14-30 | 10-21 | 13-21 |
| $CaO$ | 0-3 | 0-2 | 0-2 | 0.1-3 | 0.1-3 |

TABLE 2-continued

Glass Frit Component Formulation Ranges

| Component | Composition 5 | Composition 6 | Composition 7 | Composition 8 | Composition 9 |
|---|---|---|---|---|---|
| $Li_2O$ | 0-4 | 0-4 | 0-4 | 0.1-5 | 0.1-4 |
| SrO | 10-18 | 1-15 | 0.1-7 | 0-5 | 0-5 |
| At least one metal | 0.1-10 | 0.1-8 | 0.1-7 | 0.1-20 | 0.1-20 |

According to other embodiments, a glass frit comprises a blend of precursor materials, prior to firing, useful in preparing for a composition for forming marks or indicia on a substrate. In one embodiments, a glass frit includes: from about 8 to about 60 wt. % $SiO_2$, from about 0 to about 30 wt. % $Al_2O_3$, from about 0.1 to about 15 wt. % $B_2O_3$, from about 5 to about 30 wt. % $Na_2O$, from about 0 to about 8 wt. % CaO, from about 0 to about 8 wt. % $Li_2O$, from about 0 to about 30 wt. % SrO, and from about 0.1 to about 50 wt. % of at least one metal compound selected from the group consisting of terbium compound, europium compound, cerium compound, gadolinium compound, samarium compound, dysprosium compound, vanadium compound, and combinations thereof.

In another embodiment, a glass frit includes: from about 8 to about 55 wt. % $SiO_2$, from about 0.1 to about 25 wt. % $Al_2O_3$, from about 0.1 to about 10 wt. % $B_2O_3$, from about 8 to about 21 wt. % $Na_2O$, from about 0.1 to about 2 wt. % CaO, from about 0.1 to about 4 wt. %, $Li_2O$, from about 0 to about 18 wt. % SrO, and from about 0.1 to about 20 wt. % of at least one metal compound selected from the group consisting of terbium compound, europium compound, cerium compound, gadolinium compound, samarium compound, dysprosium compound, vanadium compound, and combinations thereof.

In yet another embodiment, a glass frit includes: from about 37 to about 49.9 wt. % $SiO_2$, from about 0 to about 10 wt. % $Al_2O_3$, from about 0.1 to about 4 wt % $B_2O_3$, from about 15 to about 20 wt. % $Na_2O$, from about 0.1 to about 2 wt. % CaO, from about 0 to about 4 wt. % $Li_2O$, from about 0 to about 10 wt. % SrO, and from about 0.1 to about 40 wt. % of at least one metal compound selected from the group consisting of terbium compound, europium compound, cerium compound, gadolinium compound, samarium compound, dysprosium compound, vanadium compound, and combinations thereof.

In still another embodiment, a glass frit includes: from about 32 to about 55 wt. % $SiO_2$, from about 0.1 to about 4 wt. % $Al_2O_3$, from about 1 to about 10 wt. % $B_2O_3$, from about 10 to about 21 wt. % $Na_2O$, from about 0.1 to about 3 wt. % CaO, from about 0.1 to about 5 wt. % $Li_2O$, from about 0 to about 5 wt. % SrO, and from about 0.1 to about 20 wt. % of at least one metal compound selected from the group consisting of terbium compound, europium compound, cerium compound, gadolinium compound, samarium compound, dysprosium compound, vanadium compound, and combinations thereof.

In still yet another embodiment, a glass frit includes: from about 34 to about 55 wt. % $SiO_2$, from about 0.1 to about 3 wt. % $Al_2O_3$, from about 6 to about 10 wt. % $B_2O_3$, from about 13 to about 21 wt. % $Na_2O$, from about 0.1 to about 3 wt. % CaO, from about 0.1 to about 4 wt. % $Li_2O$, from about 0 to about 5 wt. % SrO, and from about 0.1 to about 20 wt. % of at least one metal compound selected from the group consisting of terbium compound, europium compound, cerium compound, gadolinium compound, samarium compound, dysprosium compound, vanadium compound, and combinations thereof.

In still another embodiment, a glass frit includes: from about 17 to about 40 wt. % $SiO_2$, from about 10 to about 25 wt. % $Al_2O_3$, from about 0.1 to about 7 wt % $B_2O_3$, from about 8 to about 16 wt. % $Na_2O$, from about 0 to about 3 wt. % CaO, from about 0 to about 4 wt. % $Li_2O$, from about 10 to about 18 wt. % SrO, and from about 0.1 to about 10 wt. % of at least one metal compound selected from the group consisting of terbium compound, europium compound, cerium compound, gadolinium compound, samarium compound, dysprosium compound, vanadium compound, and combinations thereof.

In still another embodiment, a glass frit includes: from about 30 to about 40 wt. % $SiO_2$, from about 10 to about 20 wt. % $Al_2O_3$, from about 0.1 to about 5 wt. % $B_2O_3$, from about 8 to about 16 wt. % $Na_2O$, from about 0 to about 2 wt. % CaO, from about 0 to about 4 wt. % $Li_2O$, from about 1 to about 15 wt. % SrO, and from about 0.1 to about 8 wt. % of at least one metal compound selected from the group consisting of terbium compound, europium compound, cerium compound, gadolinium compound, samarium compound, dysprosium compound, vanadium compound, and combinations thereof.

In still another embodiment, a glass frit includes: from about 28 to about 60 wt. % $SiO_2$, from about 0.1 to about 7 wt. % $Al_2O_3$, from about 0.1 to about 15 wt. % $B_2O_3$, from about 14 to about 30 wt. % $Na_2O$, from about 0 to about 2 wt. % CaO, from about 0 to about 4 wt. % $Li_2O$, from about 0.1 to about 7 wt. % SrO, and from about 0.1 to about 7 wt. % of at least one metal compound selected from the group consisting of terbium compound, europium compound, cerium compound, gadolinium compound, samarium compound, dysprosium compound, vanadium compound, and combinations thereof.

Resin Binder

The marking compositions of the present invention comprise an amount of binder materials to improve rheological properties, green strength, or package stability for the compositions. Resin binders include epoxies, polyesters, acrylics, methacrylics, cellulosics, vinyls, natural proteins, styrenes, polyalkyls, carbonates, rosins, rosin esters, alkyls, drying oils, and polysaccharides such as starches, guar, dextrins and alginates, and the like.

Laser Absorber

Laser Absorber (laser absorber particles), as used herein, refers to a composition that absorbs radiant energy and bonds with the substrate to form a mark having a luminance, color value, or degrees of opacity that provide visual contrast with the substrate. In one embodiment, the laser absorber is in particulate form and is combined with the other components to form the marking compounds. Depending on the chemical composition of a marking composition, laser absorber may not be included in the marking composition.

The compositions of laser absorber particles comprise but are not limited to complex inorganic pigments, zirconium compounds, silicon compounds, calcium compounds, molybdenum compounds, vanadium compounds, bismuth containing oxide compounds, tungsten compounds, and combinations thereof.

Carrier (or Solvent)

In accordance with the present invention one or more solvents or carriers are incorporated for transferring a composition onto at least a portion of the substrate. The solvents or carriers comprise water or other aqueous-based liquids, or one or more organic solvents. If water is selected as the carrier, the water can be purified water. Examples of purified water include but are not limited to distilled water and de-ionized (DI) water.

Non-limiting examples of other solvents or carriers include alcohols such as ethanol. Non-limiting examples of organic solvents include ketones, alkanes such as butane (such as if in liquid form as a result of pressurization such as may be used for spray applications), and aromatic organic solvents such as xylenes.

Additional Components

The marking compositions may optionally include additives generally known in the art to improve dispersability, wetting, flow and rheology, and to relieve surface defects.

Fluorescent Concentrates

Fluorescent concentrates are typically formulated to provide a large range of color into a molten base glass in the forehearth. The fluorescent concentrates according to the present invention comprise a non-smelted agglomerated interspersion of particles, and can be mixed with a carrier, other solid components such as a binder, or liquid components to form a marking composition to be disposed on a surface of the substrate for laser marking process. In forming a marking composition, the fluorescent concentrates, the binder and other components are not fused or smelted together, but rather they are formed into an agglomerated interspersion of particles by physical compression or granulation. The non-smelted agglomerated interspersion of particles, which are sometimes referred to as concentrates, are non-dusting, and easy to handle. The concentrate can be formed into any size, but are preferably small to reduce the amount of time necessary for them to disperse to form a marking composition. Concentrates generally having a size of about 0.5 mm to about 10 mm, preferably about 1 mm to about 5 mm, more preferably about 2 mm to about 4 mm. Concentrates can be formed using conventional cold compaction equipment and methods.

Binder. The binder used in the concentrates according to the present invention can be any substance that is compatible with the base glass being colored and does not interfere with dispersion of the glass component. The binder is used at a rate of 10-60 wt. % of the concentrate disclosed herein, preferably 30-50 wt. %. The binder helps to hold the non-smelted agglomerated interspersion raw materials together while they are disposed on the surface of the substrate. During the laser marking process, the binder locally and temporarily reduces the fusion temperature between the concentrates and the substrate for a time sufficient to permit a rapid and thorough bonding between the concentrates and the substrate.

Suitable binders for use in the invention comprise one or more materials selected from the group consisting of alkali borates, boric acid, alkali phosphates, orthophosphoric acid, alkali silicates, fluorosilicic acid, alkali fluorides, alkali salts, alkali hydroxides and mixtures. Suitable alkali cations include the alkali metals such as sodium, potassium and lithium and the alkaline earth metals such as calcium, magnesium and barium.

Suitable alkali borates that can be employed as binders in the invention include borax, potassium pentaborate, potassium metaborate, potassium tetraborate, and calcium borate. Among the alkali phosphates which can be employed are hemisodium phosphate, monosodium phosphate, disodium phosphate, trisodium phosphate, monopotassium phosphate, dipotassium phosphate, tripotassium phosphate, monoammonium phosphate, diammonium phosphate, monocalcium phosphate, dicalcium phosphate, tricalcium phosphate, sodium acid pyrophosphate, tetrasodium pyrophosphate, tetrapotassium pyrophosphate, calcium pyrophosphate, sodium tripolyphosphate, potassium tripolyphosphate, calcium tripolyphosphate, potassium metaphosphate, sodium trimetaphosphate, sodium monofluorophosphate, calcium monofluorophosphate and sodium tetrametaphosphate. Suitable alkali silicates include sodium silicate, potassium silicate, sodium fluorosilicate and calcium fluorosilicate. Suitable alkali fluorides include sodium aluminum fluoride, calcium fluoride, lithium fluoride, anhydrous potassium fluoride, potassium fluoride dihydrate, potassium bifluoride and sodium fluoride. Suitable alkali salts include sodium carbonate and barium carbonate. Suitable alkali hydroxides include sodium hydroxide, lithium hydroxide and potassium hydroxide.

The preferred binders however are the alkali silicates formed from alkali metals such as potassium, lithium and sodium. The alkali metal silicates are preferred because they are readily dispersed when added to base glasses in the forehearth. Of the alkali silicates, the silicate of sodium is most preferred.

Method of Forming Laser Marking on Substrate

Regardless of the type of composition or ultimate use intended for the composition, marking compositions can be prepared by conventional blending and mixing techniques. The precursor materials for glass frit are blended prior to melting, which is subsequently melted in a furnace at temperatures between 1,000° C. and 1,300° C., and quenched to form a glass frit. The glass frit can be subjected to one or more size reduction operations to obtain a desired average particle size or range of average particle sizes. Subsequently, the glass frit particles, and other solid and liquid components as necessary are mixed to form a marking composition.

Generally, marking quality depends on a variety of factors, including the substrate used, marking speed (scan speed), laser spot size, beam overlap, materials thickness, and other laser parameters. The marking compositions are applied to the substrate by various methods including a brush on techniques, masking, dosing, deposition, dispensing, coating, metering, painting, spraying, pad printing, screen printing, roll coating, curtain coating, spin coating, digital printing, tape, and others.

The marking processes generally comprise three operations. One operation involves application of the marking composition to a substrate. Another operation involves bonding of the marking composition to the substrate with a laser. The final operation involves removing the excess marking material from the substrate.

In accordance with the present invention, a selected portion of the marking composition is permanently adhered to the substrate upon irradiation of the radiant energy from a laser source. As used herein, the term "adhere" is used to designate any permanent means of attachment of the irradiated marking material to the substrate. For example, the irradiated marking material is adhered to the surface of the substrate by sintering the marking material to the substrate, fusing the marking material to the surface of the substrate, diffusing at least a portion of the marking material into the substrate, reacting the marking material with the substrate, and the like.

Application

In a particular aspect, the present invention provides transfer marking media for use in the laser marking process. These media include a carrier to which is applied, or into which is incorporated, the necessary marking composition.

The thickness of the resulting coating can be adjusted and/or controlled by the use of viscosity agents in the composition, by the control of temperature, and by using optional treatments or pre-coatings on the surface to be marked. Depending upon the concentration of the glass frit and other solid component(s) in the composition and other factors, the coating thickness can be adjusted. Typically, thickness of the coating will vary depending upon coating chemistry and heat stability.

Depending upon the type of application technique, the components of the marking compositions will vary. Below in Table 3 are illustrative compositions of the range of components employed for a marking composition according to one embodiment of the present invention.

TABLE 3

Range of Components in a Composition and Typical Weight Percentages

| Component | Weight Percent (wt.%) |
|---|---|
| Carrier | 60-95 |
| Glass Frit | 5-40 |
| Resin Binder | 0-10 |
| Laser Absorber Particles | 0-10 |

Marking compositions are typically applied to the substrate with a thickness of at least about 0.1 micron, alternatively from about 1 to about 300 microns, or from about 5 to about 200 microns, or from about 10 to about 100 microns.

A marking composition can be in the form of a liquid mixed with solid particles. Water based media can be used because of their minimal environmental impact, but solvent based media can also be used to control drying rate, dispersion or moisture sensitivity of certain marking materials. Where dispersions are used, the deposited layer can be dried prior to the irradiation step. The marking composition in liquid form can be applied onto the substrate surface by various methods such as screen printing, painting, flood coating, brushing, spraying, roll coating, dipping, flow coating, electrostatic application, spin coating, digital printing, and doctor blading.

Bonding

After the marking composition is applied to the surface of the substrate, a selected portion of the marking composition is irradiated with a laser beam to adhere the irradiated marking composition to the substrate and to form a permanent marking thereon. Irradiation can be achieved by moving a laser beam over a stationary substrate using conventional beam steering methods, by moving the substrate in relation to the laser beam and/or by masking the substrate. Laser irradiation is typically achieved by directing the beam directly against the layer of marking composition, but can also be achieved by directing the beam through a sufficiently transparent substrate.

A wide array of lasers can be used for the present invention. Lasers useful in the present methods are those known as $CO_2$ lasers and fiber lasers. A $CO_2$ laser produces a beam of infrared light with the principal wavelength bands centering around 9.4 and 10.6 micrometers. For example, a suitable $CO_2$ laser can be a 35-40 watt $CO_2$ laser with about 10 micron wavelength.

A fiber laser is a laser in which the active gain medium is an optical fiber doped with rare-earth elements such as erbium, ytterbium, neodymium, dysprosium, praseodymium, and thulium. For example, a suitable fiber laser can be a 10 watt non-pulsed fiber laser with from about 904 nm to about 1065 nm wavelength.

Once the marking composition is disposed on a portion of the substrate, the beam emitting from the radiant energy source impinges upon the marking composition, which absorbs the radiant energy and increases temperature to the required level. In absorbing the radiant energy, at least a portion of the components in the marking composition is excited, i.e. has its atoms or molecules raised to an excited state. Typically, a temperature of from about 93° C. (200° F.) to about 815° C. (1500° F.) is reached in approximately one to two microseconds. Once the required temperature is achieved, the glass frit in the marking composition and substrate will permanently bond together to form a new marking layer atop the substrate.

Upon irradiation, many different types of permanent marking compositions may be achieved in accordance with the present invention. Examples of permanent marking compositions include colored or colorless sintered glass frit, inorganic chromophores fused into the surface of the glass, ceramic or metal substrate, a combination of the two, and metal oxide fused into the glass, ceramic or metal surface or reacted with the substrate material. Because of the interaction with the substrate material, the composition of the marking may vary depending on the composition of the substrate.

Evaluations

A series of tests in which the fluorescence of marks formed using a laser marking method was verified was conducted for compositions prepared according to the present invention. The glass frits disclosed herein according to the embodiments of the present invention in the compositions are responsible for the fluorescence when irradiated by a UV light source (UVG-54, UVP LLC, Upland, CA) with wavelength about 254 nm, corresponding to UVA domain which is not harmful to human eye and skin. The following examples are intended only to illustrate the invention and should not be construed as imposing limitations upon the claims.

Example 1

In a first test, fluorescent composition A was prepared according to present invention. Fluorescent composition A includes a carrier, a glass frit, as described in Table 3. Fluorescent composition A can optionally include a laser absorber, a resin binder, a dispersant, or a surfactant. The glass frit used in Composition A is described in Table 4 below. Fluorescent composition A was uniformly disposed on a borosilicate glass and a ceramic tile using a spray gun. The treated objects were dried with a hot air gun. Alternately, depending on the chemical composition, drying was not required.

TABLE 4

Components of Glass Frit in Composition A

| Components | Weight percent (Wt. %) |
| --- | --- |
| $SiO_2$ | 37-49.9 |
| $Al_2O_3$ | 0-10 |
| $B_2O_3$ | 0.1-4 |
| $Na_2O$ | 15-20 |
| CaO | 0.1-2 |
| $Li_2O$ | 0-4 |
| SrO | 0-10 |
| At least one metal compound | 0.1-40 |

Subsequently the radiant energy from a laser source is applied to the composition disposed on the ceramic tile. In-house designed power grids are used in forming laser markings. Each power grid is an array of squares (8×4, or 5×5), where each square is marked with a different set of laser parameters. As a final step, the excess composition was washed off from the surface of the ceramic tile.

Figure 2:
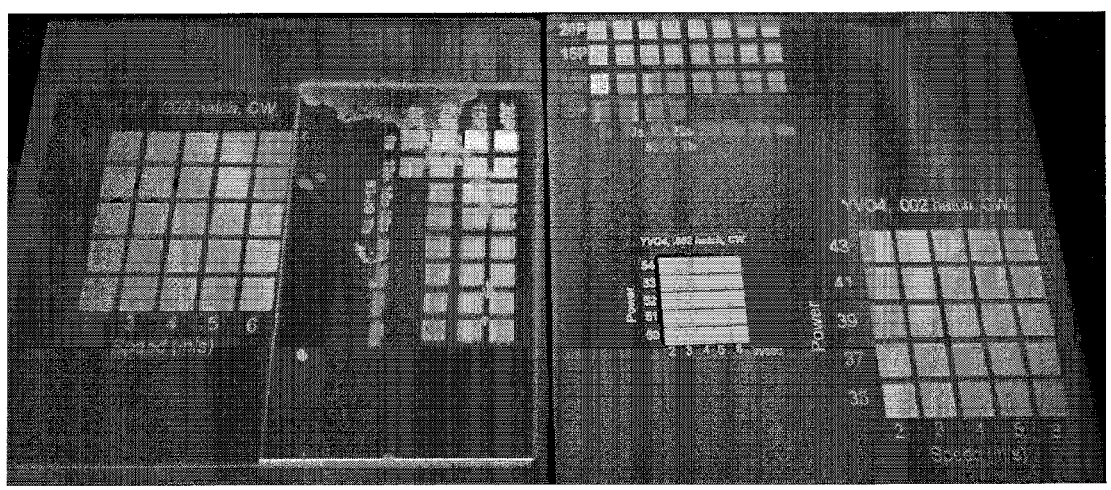
FIG. 2 is a photograph of an array of marks from Composition A formed on borosilicate glass (left) and on ceramic tile (right) by a laser marking process according to one embodiment of the present invention, where the array of marks is irradiated by ultraviolet rays.

For Composition A, a 10-watt fiber laser was used as the source of the radiant energy. For the fiber laser, the power levels used were about 5.6, 5.92, 6.24, 6.56, and 6.88 watts (marked as power levels of '35', '37', '39', '41' and '43', respectively to the left side of the array shown in FIGS. 1 and 2). Each row of marks is formed by varying the laser scan speed between 2 and 6 inch per second while applying a fixed level of laser power. FIG. 1 shows the array of marks formed by a fiber laser from Composition A irradiated under a normal fluorescent light with wavelengths ranging from about 480 nm to about 570 nm. The array of marks from Composition A exhibited light colored marks, and did not exhibit any substantial variation of brightness between neighboring marks. FIG. 2 shows that the array of marks exhibits light green fluorescence under UV rays.

Example 2

In another test, an inventive composition, Composition B, was prepared according to the present invention. Composition B includes a carrier, a glass frit, as described in Table 3. Composition B can optionally include a laser absorber particle, a resin binder, a dispersant, or a surfactant. The glass frit used in Composition B is described in Table 5 below. The glass frit also includes at least one or more rare earth compounds described herein. Composition B was disposed on the surface of a borosilicate glass and a ceramic tile by spray gun, and an array of marking was formed by a $CO_2$ laser.

TABLE 5

Components of Glass Frit in Composition B

| Components | Weight percent (Wt. %) |
| --- | --- |
| $SiO_2$ | 32-55 |
| $Al_2O_3$ | 0.1-4 |
| $B_2O_3$ | 1-10 |
| $Na_2O$ | 10-21 |
| CaO | 0.1-3 |
| $Li_2O$ | 0.1-5 |
| SrO | 0-5 |
| At least one metal compound | 0.1-20 |

Figure 3:
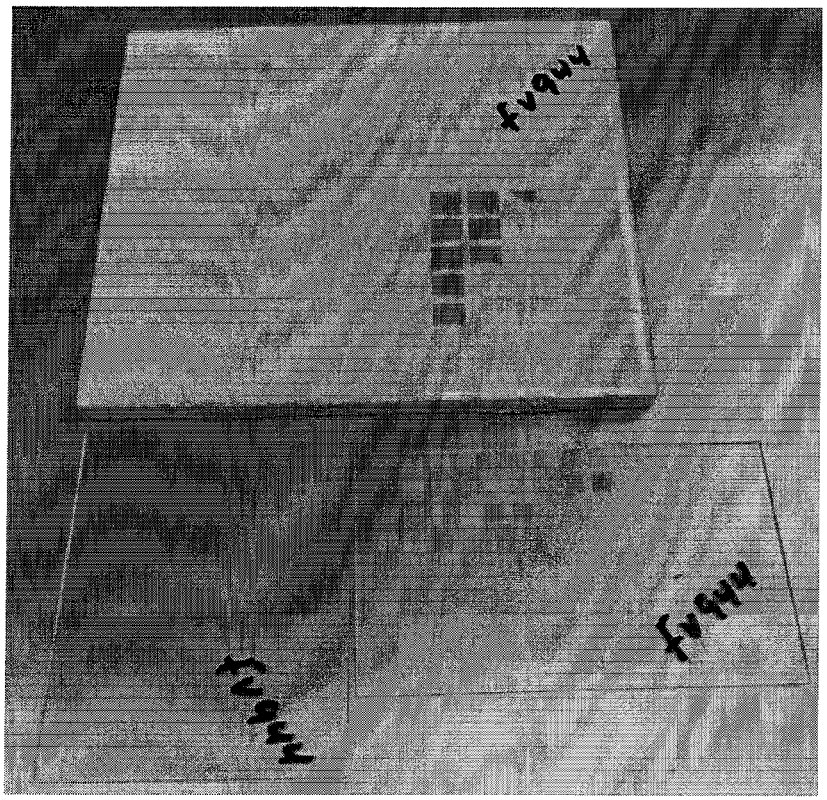
FIG. 3 is a photograph of an array of marks from Composition B formed on borosilicate glass (bottom) and on ceramic tile (top) by a laser marking process according to one embodiment of the present invention, where the array of marks is irradiated by a normal fluorescent lighting.
Figure 4:
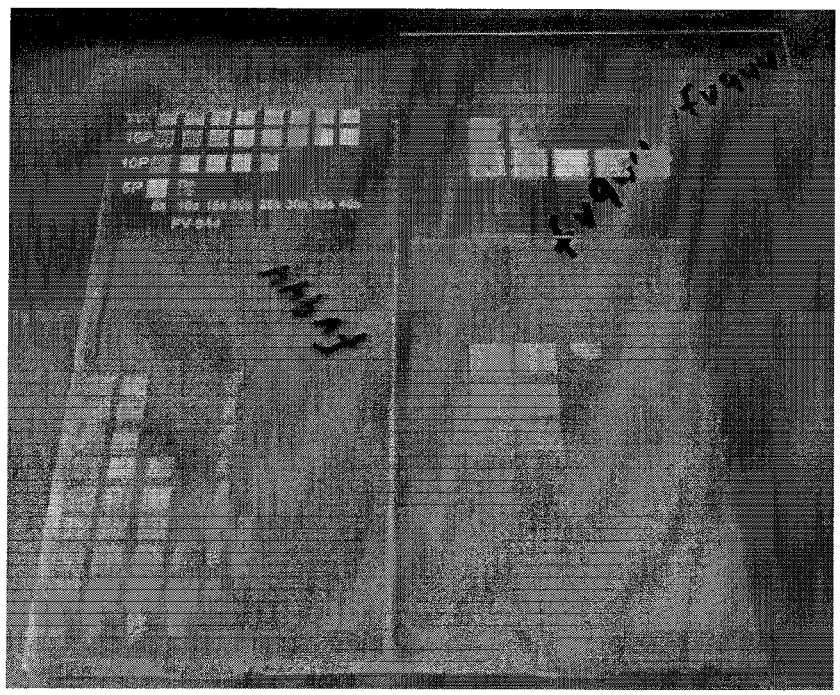
FIG. 4 is a photograph of an array of marks from Composition B formed on borosilicate glass (bottom left/top right) and on ceramic tile (top left/bottom right) by a laser marking process according to one embodiment of the present invention, where the array of marks is irradiated by ultraviolet rays.

A 40-watt $CO_2$ laser was used for providing the radiant energy to the composition disposed on the surface of the substrates. For $CO_2$ laser, laser power levels varied between about 2, 4, 6, and 8 watts (marked as '5P', '10P', '15P' and '20P' respectively to the left side of the array shown in FIGS. 3-4), and the laser scan speed varied between 5 and 40 inch/second. Images for the arrays of laser marks prepared from Composition B are shown in FIGS. 3-4. FIG. 3 shows that color of the array of marks slightly change with respect to laser power and scan speed, and exhibits light gray to dark gray colors when irradiated under a normal fluorescent lighting. FIG. 4 shows that the array of marks emits blue fluorescence under UV rays.

Example 3

In another test, an inventive composition, Composition C, was prepared according to the present invention. Composition C includes a carrier, a glass frit, as described in Table 3. The glass frit used in Composition C is described in Table 6 below, and substantially similar to Composition A. Compared to Composition A, different type of metal compound(s) ware included in the Composition C. An array of marking was formed by a $CO_2$ laser in a similar way to Composition A and Composition B. That is, Composition C was disposed on the surface of the substrates including borosilicate glass and ceramic tile by spray gun.

TABLE 6

Components of Glass Frit in Composition C

| Components | Weight percent (Wt. %) |
| --- | --- |
| $SiO_2$ | 37-49.9 |
| $Al_2O_3$ | 0-10 |
| $B_2O_3$ | 0.1-4 |
| $Na_2O$ | 15-20 |
| CaO | 0.1-2 |
| $Li_2O$ | 0-4 |
| SrO | 0-10 |
| At least one metal compound | 0.1-40 |

A 40-watt $CO_2$ laser was used for providing the radiant energy to the composition disposed on the surface of the substrates. Laser power levels varied between about 2, 4, 6, and 8 watts, and the laser scan speed varied between 5 and 40 inch/second. The arrays of laser marks prepared from Composition C are formed on the borosilicate glass and ceramic tile. The array of marks exhibits red fluorescence under UVA rays. The intensity of fluorescence varied with the laser power and scan speed during the laser marking process.

Example 4

In another test, an inventive composition, Composition D, was prepared according to the present invention. Composition D includes a carrier, a glass frit, as described in Table 3. Composition D can optionally include a laser absorber particle, a resin binder, a dispersant, or a surfactant. The glass frit used in Composition D is described in Table 7 below. Composition D was disposed on the surface of a borosilicate glass and a ceramic tile by spray gun.

TABLE 7

Components of Glass Frit in Composition

| Components | Weight percent (Wt. %) |
| --- | --- |
| $SiO_2$ | 17-40 |
| $Al_2O_3$ | 10-25 |
| $B_2O_3$ | 0.1-7 |

TABLE 7-continued

Components of Glass Frit in Composition

| Components | Weight percent (Wt. %) |
|---|---|
| $Na_2O$ | 8-16 |
| CaO | 0-3 |
| $Li_2O$ | 0-4 |
| SrO | 10-18 |
| At least one metal compound | 0.1-10 |

A 40-watt $CO_2$ laser was used to form an array of marks on the surface of a borosilicate glass and a ceramic tile. For $CO_2$ laser, laser power levels varied between about 2, 4, 6, and 8 watts, and the laser scan speed varied between 5 and 40 inch per second. When irradiated by UV rays, the array of marks on both a borosilicate glass and a ceramic tile emit green fluorescence.

In all Examples, it was observed that the intensity of fluorescence under UVA varied with the glass frit size in the compositions. The intensity of fluorescence significantly increased as the average glass frit particle size ranges from about 0.1-20 micron, preferably between about 0.5-15 micron, more preferably between about 2-12 micron, or most preferably between about 5-10 micron.

It will be understood that any one or more compositions of one embodiment described herein can be combined with one or more other compositions of another embodiment. Thus, the present invention includes any and all combinations of compositions of the embodiments described herein.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims.

The invention is further described with respect to the following items.

Item 1. A marking composition for forming marks or indicia on a substrate, the composition comprising:
   a carrier from about 60 to about 95 wt. %; and
   a glass frit from about 5 wt. % to about 40 wt. %, the glass frit comprising:
      from about 10 to about 60 wt. % $SiO_2$,
      from about 0.1 to about 30 wt. % $B_2O_3+Al_2O_3$,
      from about 10 to about 35 wt. % $Na_2O+Li_2O$,
      from about 0.1 to about 30 wt. % CaO+SrO, and
      from about 0.1 to about 50 wt. % of at least one metal compound selected
         from the group consisting of terbium compound, europium compound, cerium compound, gadolinium compound, samarium compound, dysprosium compound, vanadium compound, and combinations thereof,
   wherein the glass frit has an average particle size between about 0.1 and about 20 microns, and
   wherein the glass frit is devoid of at least one of lead, cadmium, nickel, chromium and combinations thereof.

Item 2. The marking composition of item 1, wherein the glass frit comprises from about 10 to about 42 wt. % of the at least one metal compound.

Item 3. The marking composition of item 1, wherein the at least one metal compound is selected from the group consisting of terbium compound, europium compound, and cerium compound.

Item 4. The marking composition of item 1, wherein the glass frit comprises:
   from about 24 to about 50 wt. % $SiO_2$,
   from about 0.1 to about 7 wt. % $B_2O_3+Al_2O_3$,
   from about 15 to about 20 wt. % $Na_2O+Li_2O$,
   from about 0.1 to about 4 wt. % CaO+SrO, and
   from about 0.1 to about 45 wt. % of at least one metal compound selected from the group consisting of terbium compound, europium compound, cerium compound, gadolinium compound, samarium compound, dysprosium compound, vanadium compound, and combinations thereof.

Item 5. The marking composition of item 1, wherein the glass frit comprises:
   from about 31 to about 55 wt. % $SiO_2$,
   from about 5 to about 13 wt. % $B_2O_3+Al_2O_3$,
   from about 18 to about 25 wt. % $Na_2O+Li_2O$,
   from about 0.1 to about 4 wt. % CaO+SrO, and
   from about 0.1 to about 27 wt. % of at least one metal compound selected from the group consisting of terbium compound, europium compound, cerium compound, gadolinium compound, samarium compound, dysprosium compound, vanadium compound, and combinations thereof.

Item 6. The marking composition of item 5, wherein the glass frit comprises:
   from about 38 to about 49 wt. % $SiO_2$,
   from about 5 to about 13 wt. % $B_2O_3+Al_2O_3$,
   from about 18 to about 24 wt. % $Na_2O+Li_2O$,
   from about 0.1 to about 3 wt. % CaO+SrO, and
   from about 0.1 to about 22 wt. % of at least one metal compound selected from the group consisting of terbium compound, europium compound, cerium compound, gadolinium compound, samarium compound, dysprosium compound, vanadium compound, and combinations thereof.

Item 7. The marking composition of item 1, wherein the glass frit comprises:
   from about 10 to about 40 wt. % $SiO_2$,
   from about 10 to about 30 wt. % $B_2O_3+Al_2O_3$,
   from about 1 to about 20 wt. % $Na_2O+Li_2O$,
   from about 20 to about 30 wt. % CaO+SrO, and
   from about 0.1 to about 10 wt. % of at least one metal compound selected from the group consisting of terbium compound, europium compound, cerium compound, gadolinium compound, samarium compound, dysprosium compound, vanadium compound, and combinations thereof.

Item 8. The marking composition of item 7, wherein the glass frit comprises:
   from about 25 to about 53.9 wt. % $SiO_2$,
   from about 18 to about 30 wt. % $B_2O_3+Al_2O_3$,
   from about 8 to about 16 wt. % $Na_2O+Li_2O$,
   from about 20 to about 30 wt. % CaO+SrO, and
   from about 0.1 to about 8 wt. % of at least one metal compound selected from the group consisting of terbium compound, europium compound, cerium compound, gadolinium compound, samarium compound, dysprosium compound, vanadium compound, and combinations thereof.

Item 9. The marking composition of item 1, wherein the glass frit comprises:
 from about 35 to about 60 wt. % $SiO_2$,
 from about 8 to about 15 wt. % $B_2O_3+Al_2O_3$,
 from about 15 to about 25 wt. % $Na_2O+Li_2O$,
 from about 8 to about 15 wt. % CaO+SrO, and
 from about 0.1 to about 10 wt. % of at least one metal compound selected from the group consisting of terbium compound, europium compound, cerium compound, gadolinium compound, samarium compound, dysprosium compound, vanadium compound, and combinations thereof.

Item 10. A marking composition for forming marks or indicia on a substrate, the composition comprising:
 a carrier from about 60 wt. % to about 95 wt. %;
 a glass frit from about 5 wt. % to about 40 wt. %, the glass frit comprising:
  from about 8 to about 60 wt. % $SiO_2$,
  from about 0 to about 30 wt. % $Al_2O_3$,
  from about 0.1 to about 15 wt. % $B_2O_3$,
  from about 5 to about 30 wt. % $Na_2O$,
  from about 0 to about 8 wt. % CaO,
  from about 0 to about 8 wt. % $Li_2O$,
  from about 0 to about 30 wt. % SrO, and
  from about 0.1 to about 50 wt. % of at least one metal compound selected from the group consisting of terbium compound, europium compound, cerium compound, gadolinium compound, samarium compound, dysprosium compound, vanadium compound, and combinations thereof,
 wherein the glass frit has an average particle size between about 0.1 and about 20 microns, and
 wherein the glass frit is devoid of at least one of lead, cadmium, nickel, chromium and combinations thereof.

Item 11. The marking composition of item 10, the glass frit comprising:
 from about 8 to about 55 wt. % $SiO_2$,
 from about 0.1 to about 25 wt. % $Al_2O_3$,
 from about 0.1 to about 10 wt. % $B_2O_3$,
 from about 8 to about 21 wt. % $Na_2O$,
 from about 0.1 to about 2 wt. % CaO,
 from about 0.1 to about 4 wt. % $Li_2O$,
 from about 0 to about 18 wt. % SrO, and
 from about 0.1 to about 20 wt. % of at least one metal compound selected from the group consisting of terbium compound, europium compound, cerium compound, gadolinium compound, samarium compound, dysprosium compound, vanadium compound, and combinations thereof.

Item 12. The marking composition of item 10, wherein the at least one metal compound is selected from the group consisting of terbium compound, europium compound, and cerium compound.

Item 13. The marking composition of item 10, the glass frit comprising:
 from about 37 to about 49.9 wt. % $SiO_2$,
 from about 0 to about 15 10 wt. % $Al_2O_3$,
 from about 0.1 to about 4 wt. % $B_2O_3$,
 from about 15 to about 20 wt. % $Na_2O$,
 from about 0.1 to about 2 wt. % CaO,
 from about 0 to about 4 wt. % $Li_2O$,
 from about 0 to about 10 wt. % SrO, and
 from about 0.1 to about 40 wt. % of at least one metal compound selected
 from the group consisting of terbium compound, europium compound, cerium compound, gadolinium compound, samarium compound, dysprosium compound, vanadium compound, and combinations thereof.

Item 14. The marking composition of item 11, the glass frit comprising:
 from about 32 to about 55 wt % $SiO_2$,
 from about 0.1 to about 4 wt. % $Al_2O_3$,
 from about 1 to about 10 wt. % $B_2O_3$,
 from about 10 to about 21 wt. % $Na_2O$,
 from about 0.1 to about 3 wt. % CaO,
 from about 0.1 to about 5 wt. % $Li_2O$,
 from about 0 to about 5 wt. % SrO, and
 from about 0.1 to about 20 wt. % of at least one metal compound selected from the group consisting of terbium compound, europium compound, cerium compound, gadolinium compound, samarium compound, dysprosium compound, vanadium compound, and combinations thereof.

Item 15. The marking composition of item 14, the glass frit comprising:
 from about 34 to about 55 wt. % $SiO_2$,
 from about 0.1 to about 3 wt. % $Al_2O_3$,
 from about 6 to about 10 wt. % $B_2O_3$,
 from about 13 to about 21 wt. % $Na_2O$,
 from about 0.1 to about 3 wt. % CaO,
 from about 0.1 to about 4 wt. % $Li_2O$,
 from about 0 to about 5 wt. % SrO, and
 from about 0.1 to about 20 wt. % of at least one metal compound selected from the group consisting of terbium compound, europium compound, cerium compound, gadolinium compound, samarium compound, dysprosium compound, vanadium compound, and combinations thereof.

Item 16. The marking composition of item 11, the glass frit comprising:
 from about 17 to about 40 wt. % $SiO_2$,
 from about 10 to about 25 wt. % $Al_2O_3$,
 from about 0.1 to about 7 wt. % $B_2O_3$,
 from about 8 to about 16 wt. % $Na_2O$,
 from about 0 to about 3 wt. % CaO,
 from about 0 to about 4 wt. % $Li_2O$,
 from about 10 to about 18 wt. % SrO, and
 from about 0.1 to about 10 wt. % of at least one metal compound selected from the group consisting of terbium compound, europium compound, cerium compound, gadolinium compound, samarium compound, dysprosium compound, vanadium compound, and combinations thereof.

Item 17. The marking composition of item 16, the glass frit comprising:
 from about 30 to about 40 wt. % $SiO_2$,
 from about 10 to about 20 wt. % $Al_2O_3$,
 from about 0.1 to about 5 wt. % $B_2O_3$,
 from about 8 to about 16 wt. % $Na_2O$,
 from about 0 to about 2 wt. % CaO,
 from about 0 to about 4 wt. % $Li_2O$,
 from about 1 to about 15 wt % SrO, and
 from about 0.1 to about 8 wt % of at least one metal compound selected from the group consisting of terbium compound, europium compound, cerium compound, gadolinium compound, samarium compound, dysprosium compound, vanadium compound, and combinations thereof Item 18. The marking composition of item 10, the glass frit comprising:
 from about 28 to about 60 wt. % $SiO_2$,
 from about 0.1 to about 7 wt. % $Al_2O_3$,
 from about 0.1 to about 15 wt. % $B_2O_3$, from about 14 to about 30 wt. % Na$_2$O,
from about 0 to about 2 wt. % CaO,
from about 0 to about 4 wt. % Li$_2$O,
from about 0.1 to about 7 wt. % SrO, and
from about 0.1 to about 7 wt. % of at least one metal compound selected from the group consisting of terbium compound, europium compound, cerium compound, gadolinium compound, samarium compound, dysprosium compound, vanadium compound, and combinations thereof.

Item 20. The marking composition of item 10, wherein the glass frit has an average particle size between about 1 and about 15 microns.

Item 21. The marking composition of item 10, wherein the glass frit has an average particle size between about 3 microns o about 10 microns.

Item 22. The marking composition of item 10, wherein the glass frit has a coefficient of thermal expansion between about 85×10$^{-7}$/K to about 150×10$^{-7}$/K.

Item 23. The marking composition of item 10, wherein the glass frit is devoid of lead, cadmium, nickel, chromium, and compounds thereof.

Item 24. A concentrate comprising the glass frit of claim 10.

Item 25. The concentrate of item 24, further comprising a silicate and one or more fluxing agent.

Item 26. The concentrate of item 25, wherein the silicate comprises a sodium silicate.

Item 27. A method of forming marks or indicia on a substrate, the method comprising:
providing a substrate;
providing a composition comprising:
　a carrier from about 60 to about 95 wt. %;
　a glass frit comprising from about 5 wt. % to about 40 wt. %, the glass frit comprising:
　　from about 8 to about 60 wt. % SiO$_2$,
　　from about 0 to about 30 wt. % Al$_2$O$_3$,
　　from about 0.1 to about 15 wt. % B$_2$O$_3$,
　　from about 5 to about 30 wt. % Na$_2$O,
　　from about 0 to about 8 wt. % CaO,
　　from about 0 to about 8 wt. % Li$_2$O,
　　from about 0 to about 30 wt. % SrO, and
　　from about 1 to about 50 wt. % of at least one metal compound selected from the group consisting of terbium compound, europium compound, cerium compound, gadolinium compound, samarium compound, dysprosium compound, vanadium compound, and combinations thereof,
　wherein the glass frit has an average particle size between about 0.1 and about 20 microns, and
　wherein the glass frit is devoid of at least one of lead, cadmium, nickel, chromium and combinations thereof, and
disposing the composition on at least a portion of the substrate;
exposing at least a portion of the composition to a radiant energy from a laser source such that the at least a portion of the composition increases in temperature, at least partially adheres to the substrate, and forms marks or indicia on the substrate that has a luminance, color, and/or degree of opacity that contrasts the substrate.

Item 28. The method of item 27, wherein the marks or indicia on the substrate emit fluorescence when illuminated by ultraviolet rays.

Item 29. The method of item 27, wherein the substrate comprises glass or a ceramic tile.

Item 30. The method of item 27, wherein the glass comprises borosilicate glass.

Item 31. The method of item 27, wherein the disposing the composition comprises forming the composition by spray or screen printing.

Item 32. The method of item 27, wherein the laser source comprises CO$_2$ laser or fiber laser.

Additional advantages and modifications will readily occur to those skilled in the art. Therefore, the invention in its broader aspects is not limited to the specific details and illustrative example shown and described herein.

The invention claimed is:

1. A marking composition for forming marks or indicia on a substrate, the composition comprising:
　from about 60 to about 95 wt. % of a carrier;
　from about 5 wt. % to about 40 wt. % a glass frit, the glass frit comprising:
　　from about 8 to about 60 wt. % SiO$_2$,
　　from about 0 to about 30 wt. % Al$_2$O$_3$,
　　from about 0.1 to about 15 wt. % B$_2$O$_3$,
　　from about 5 to about 30 wt. % Na$_2$O,
　　from about 0 to about 8 wt. % CaO,
　　from about 0 to about 8 wt. % Li$_2$O,
　　from about 0 to about 30 wt. % SrO, and
　　from about 0.1 to about 50 wt. % of at least one compound selected from the group consisting of terbium compound, europium compound, cerium compound, gadolinium compound, samarium compound, dysprosium compound, vanadium compound, and combinations thereof, wherein;
　the glass frit has an average particle size within the range of from about 0.1 to about 20 microns, and wherein;
　the glass frit is devoid of at least one of lead, cadmium, nickel, chromium and combinations thereof.

2. The marking composition of claim 1, wherein the at least one compound is selected from the group consisting of terbium compound, europium compound, and cerium compound.

3. The marking composition of claim 1, the glass frit comprising:
　from about 8 to about 55 wt. % SiO$_2$,
　from about 0.1 to about 25 wt. % Al$_2$O$_3$,
　from about 0.1 to about 10 wt. % B$_2$O$_3$,
　from about 8 to about 21 wt. % Na$_2$O,
　from about 0.1 to about 2 wt. % CaO,
　from about 0.1 to about 4 wt. % Li$_2$O,
　from about 0 to about 18 wt. % SrO, and
　from about 0.1 to about 20 wt. % of at least one compound selected from the group consisting of terbium compound, europium compound, cerium compound, gadolinium compound, samarium compound, dysprosium compound, vanadium compound, and combinations thereof.

4. The marking composition of claim 3, the glass frit comprising:
　from about 32 to about 55 wt. % SiO$_2$,
　from about 0.1 to about 4 wt. % Al$_2$O$_3$,
　from about 1 to about 10 wt. % B$_2$O$_3$,
　from about 10 to about 21 wt. % Na$_2$O,
　from about 0.1 to about 3 wt. % CaO,
　from about 0.1 to about 5 wt. % Li$_2$O,
　from about 0 to about 5 wt. % SrO, and
　from about 0.1 to about 20 wt. % of at least one compound selected from the group consisting of terbium compound, europium compound, cerium compound, gadolinium compound, samarium compound, dysprosium compound, vanadium compound, and combinations thereof.

5. The marking composition of claim 3, the glass frit comprising:
   from about 34 to about 55 wt. % $SiO_2$,
   from about 0.1 to about 3 wt. % $Al_2O_3$,
   from about 6 to about 10 wt. % $B_2O_3$,
   from about 13 to about 21 wt. % $Na_2O$,
   from about 0.1 to about 3 wt. % CaO,
   from about 0.1 to about 4 wt. % $Li_2O$,
   from about 0 to about 5 wt. % SrO, and
   from about 0.1 to about 20 wt. % of at least one compound selected from the group consisting of terbium compound, europium compound, cerium compound, gadolinium compound, samarium compound, dysprosium compound, vanadium compound, and combinations thereof.

6. The marking composition of claim 3, the glass frit comprising:
   from about 17 to about 40 wt. % $SiO_2$,
   from about 10 to about 25 wt. % $Al_2O_3$,
   from about 0.1 to about 7 wt. % $B_2O_3$,
   from about 8 to about 16 wt. % $Na_2O$,
   from about 0 to about 3 wt. % CaO,
   from about 0 to about 4 wt. % $Li_2O$,
   from about 10 to about 18 wt. % SrO, and
   from about 0.1 to about 10 wt. % of at least one compound selected from the group consisting of terbium compound, europium compound, cerium compound, gadolinium compound, samarium compound, dysprosium compound, vanadium compound, and combinations thereof.

7. The marking composition of claim 6, the glass frit comprising:
   from about 30 to about 40 wt. % $SiO_2$,
   from about 10 to about 20 wt. % $Al_2O_3$,
   from about 0.1 to about 5 wt. % $B_2O_3$,
   from about 8 to about 16 wt. % $Na_2O$,
   from about 0 to about 2 wt. % CaO,
   from about 0 to about 4 wt. % $Li_2O$,
   from about 1 to about 15 wt. % SrO, and
   from about 0.1 to about 8 wt. % of at least one compound selected from the group consisting of terbium compound, europium compound, cerium compound, gadolinium compound, samarium compound, dysprosium compound, vanadium compound, and combinations thereof.

8. The marking composition of claim 1, the glass frit comprising:
   from about 28 to about 60 wt. % $SiO_2$,
   from about 0.1 to about 7 wt. % $Al_2O_3$,
   from about 0.1 to about 15 wt. % $B_2O_3$,
   from about 14 to about 30 wt. % $Na_2O$,
   from about 0 to about 2 wt. % CaO,
   from about 0 to about 4 wt. % $Li_2O$,
   from about 0.1 to about 7 wt. % SrO, and
   from about 0.1 to about 7 wt. % of at least one compound selected from the group consisting of terbium compound, europium compound, cerium compound, gadolinium compound, samarium compound, dysprosium compound, vanadium compound, and combinations thereof.

9. The marking composition of claim 1, wherein the glass frit is devoid of lead, cadmium, nickel, chromium, and compounds thereof.

10. The marking composition of claim 1, wherein the glass frit has an average particle size within the range of from about 1 to about 15 microns.

11. The marking composition of claim 1, wherein the glass frit has an average particle size within the range of from about 3 to about 10 microns.

12. The marking composition of claim 1, wherein the glass frit has a coefficient of thermal expansion between about $85 \times 10^{-7}/°K$ to about $150 \times 10^{-7}/°K$.

* * * * *